(12) United States Patent
Gou et al.

(10) Patent No.: US 9,584,295 B2
(45) Date of Patent: Feb. 28, 2017

(54) USER EQUIPMENT, AND METHOD AND SYSTEM SIDE FOR CONFIGURING PHYSICAL RESOURCE BLOCK OF SEARCH SPACE THEREOF

(71) Applicant: ZTE CORPORATION, Shenzhen, Guangdong Province (CN)

(72) Inventors: Wei Gou, Shenzhen (CN); Zhisong Zuo, Shenzhen (CN); Zhaohua Lu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 10 days.

(21) Appl. No.: 14/439,773

(22) PCT Filed: Aug. 28, 2013

(86) PCT No.: PCT/CN2013/082449
§ 371 (c)(1),
(2) Date: Apr. 30, 2015

(87) PCT Pub. No.: WO2014/067332
PCT Pub. Date: May 8, 2014

(65) Prior Publication Data
US 2015/0304091 A1    Oct. 22, 2015

(30) Foreign Application Priority Data
Nov. 2, 2012   (CN) .......................... 2012 1 0433359

(51) Int. Cl.
*H04W 4/00*   (2009.01)
*H04L 5/00*   (2006.01)
*H04W 72/04*   (2009.01)

(52) U.S. Cl.
CPC .......... *H04L 5/0091* (2013.01); *H04L 5/0007* (2013.01); *H04L 5/0048* (2013.01);
(Continued)

(58) Field of Classification Search
None
See application file for complete search history.

(56) References Cited

U.S. PATENT DOCUMENTS

| 2013/0083753 A1 | 4/2013 | Lee et al. |
| 2013/0114522 A1* | 5/2013 | Frenne .................. H04L 5/0094 370/329 |

(Continued)

FOREIGN PATENT DOCUMENTS

| CN | 102083226 A | 6/2011 |
| CN | 102202324 A | 9/2011 |
| CN | 102395206 A | 3/2012 |

OTHER PUBLICATIONS

Search Space Design for ePDCCH; Alcatel-Lucent Shanghai Bell, Alcatel-Lucent; 3GPP TSG RAN WG1 Meeting #68bis; Jeju, Korea, Mar. 26-30, 2012. R1-121252.
(Continued)

*Primary Examiner* — Chi H Pham
*Assistant Examiner* — Fahmida Chowdhury
(74) *Attorney, Agent, or Firm* — Ling Wu; Stephen Yang; Ling and Yang Intellectual Property

(57) ABSTRACT

A method for configuring a physical resource block of a user equipment search space includes: a system side configuring a Physical Resource Block (PRB) pair of a default User equipment specific Search Space (USS), and notifying the user equipment of positions of the PRB pairs of the default USS, or the system side agreeing with the user equipment on the positions of the PRB pairs of the default USS. The user equipment obtains the positions of the PRB pairs of the default USS according to the notification from the system side, or agrees with the system side on the positions of the PRB pairs of the default USS. The embodiments of the present document further provide the system side and the user equipment.

19 Claims, 2 Drawing Sheets

(52) U.S. Cl.
CPC .......... *H04L 5/0053* (2013.01); *H04L 5/0094* (2013.01); *H04W 72/04* (2013.01); *H04W 72/0406* (2013.01); *H04L 5/001* (2013.01)

(56) References Cited

U.S. PATENT DOCUMENTS

| | | | |
|---|---|---|---|
| 2013/0242750 A1* | 9/2013 | Baker | H04W 72/042 370/241 |
| 2013/0301608 A1* | 11/2013 | Frenne | H04W 74/004 370/331 |
| 2014/0036747 A1* | 2/2014 | Nory | H04W 72/0406 370/311 |

OTHER PUBLICATIONS

Configuration for monitoring EPDCCH; New Postcom; 3GPP TSG RAN WG1 Meeting #70bis; San Diego, USA, Oct. 8-12, 2012. R1-124224.

* cited by examiner

USER EQUIPMENT, AND METHOD AND SYSTEM SIDE FOR CONFIGURING PHYSICAL RESOURCE BLOCK OF SEARCH SPACE THEREOF

TECHNICAL FIELD

The present document relates to the field of mobile wireless communications, and in particular, to a method for configuring a physical resource block of a user equipment search space, a user equipment, and a system side.

BACKGROUND OF THE RELATED ART

With the development of the mobile communications industry and the growing demand for mobile data services, the user's requirements for mobile communication rate and Quality of service (Qos) is increasing. Therefore, before the 3rd Generation (3G) mobile communication has been commercially applied in a large scale, research and development works of the next Generation mobile communication system have already started, and a relatively typical work is the Long Term Evolution (LTE) projection launched by the 3rd Generation Partnership Project (3GPP), and the highest spectrum bandwidth which can be provided by the LTE system is 20 MHz. With further evolution of the network, the LTE-advanced (LTE-A), as an evolved system of the LTE, can provide a spectrum bandwidth up to 100 MHz, and support more flexible communication with a higher quality, and at the same time the LTE-A system has a better backward compatibility. In the LTE-A system, there are multiple component carriers (CC), an LTE terminal can only work on a certain backward compatible CC, while an LTE-A terminal with a stronger capability can transmit on multiple CCs at the same time. This realizes that the LTE-A terminal transmits and receives data on multiple component carriers at the same time, so as to achieve the purpose of improving the bandwidth. The technology is referred to as multi-carrier aggregation technology.

In the research at this stage, on the basis of multi-carrier aggregation technology, the LTE R11 stage puts forward new requirements for aspects such as spectrum resource utilization, network energy saving, as well as inter-cell interference suppression. In order to achieve this goal, the New Carrier Type (NCT for short) is proposed currently. By means of the application of the carrier aggregation technology, the new carrier type has a distinct feature, i.e., there is no need to consider backward compatibility when designing, and more new technologies can be applied therein. For example, at present, in the LTE R11, the new carrier type is defined as follows: it needs to operate with at least one compatible carrier in a pairing manner (also referred to as operation with a compatible carrier in a carrier aggregation manner), and in the new carrier type, Cell-specific Reference Signals (CRS for short) of the LTE R8 are not configured, to avoid serious CRS interference of the adjacent cell at the edge of the cell, especially CRS interference between a macro cell and a micro cell in a scenario of HETerogeneous NETwork (HeNet).

Further, as the LTE R11 progresses slowly, finally in consideration that the standard work of the NCT cannot be completed within a time period, the related research on the NCT technology is put off until the LTE R12, and the contents accepted in the LTE R11 are still accepted. At present, the standardization work of the LTE R12 has not started, and many companies have believed that in the LTE R12, not only the NCT of the LTE R11 continues to be researched, but also it needs to further increase other NCT technologies, for example, a standalone NCT is proposed, which has an independent operation capability. In order to distinguish from the NCT in the LTE R11, as the NCT in the LTE R11 needs to configure a backward compatible carrier, it is referred to as a non-standalone NCT, which needs to operate with the help of a paired compatible carrier thereof as it deletes part of channels/signaling.

Further, in a standalone NCT, it has been determined that the positions of the Physical Resource Block (PRB) pairs occupied by a UE specific Search Space (USS) of an enhanced Physical Downlink Control Channel (ePDCCH) are notified through high-layer signaling, and in particular, are notified in a User Equipment (UE) specific manner. In this way, the PRB pairs of the USS of the UE may configure PRB pairs of the common USS for part of UEs which need them. For example, in the Coordinated Multi-Point (COMP), USSs of the UEs which require coordination are configured in the same PRB pairs through signaling respectively for the UEs, which is beneficial for the UE to reduce the search space, and would not affect configuration of PRBs of the USS of other irrelevant UEs.

With respect to notifying the positions of the PRB pairs of the USS of the ePDCCH of the UE through a UE dedicated Radio Resource Control (RRC for short) message, there are the following problems at present: In the process that the UE accesses in downlink until an RRC connection is established, a random access process is necessarily to be completed, wherein it needs to receive a Message 4 (msg4) as one of downlink messages in the random access process. If Downlink Control Information (DCI) for scheduling is transmitted in the USS of the UE for the msg4, it is a problem for the UE to acquire the position of the PRB pair where the USS of the UE is located. Another problem is that assuming the UE completes a random access process in another manner, the base station needs to transmit some dedicated RRC messages to the UE, and at this time, when the UE receives a first dedicated RRC message transmitted by the base station, the dedicated RRC message is transmitted through scheduling of the USS. In this case, there is a problem for the UE to acquire the positions of the USS for scheduling the first dedicated RRC message in the PRB pairs.

Obviously, according to the current conclusion, the PRB pairs of the USS of the UE are transmitted to the UE through a dedicated RRC message of the UE, it needs to firstly establish an RRC connection for transmitting the dedicated RRC message, and at present, in the process of establishing the RRC connection, the UE needs to acquire the positions of the PRB pairs of the USS, or the UE needs to acquire the positions of the PRB pairs of the USS when receiving the first dedicated RRC message.

SUMMARY

The technical problem to be solved by the present document is to provide a method for configuring PRB pairs of a USS of an ePDCCH, to facilitate completing configuration of the USS of the ePDCCH in a standalone NCT, so that the scheme of indicating the positions of the PRB pairs of the USS through a dedicated RRC message is feasible.

In order to solve the above problem, the present document provides a method for configuring a physical resource block of a user equipment search space, comprising:

a system side configuring Physical Resource Block (PRB) pairs of a default User equipment specific Search Space (USS), and notifying the user equipment of positions of the PRB pairs of the default USS, or the system side agreeing with the user equipment on the positions of the PRB pairs of the default USS.

The above method may further have the following features: the PRB pairs of the default USS are used as PRB pairs of a USS of the user equipment when the positions of the PRB pairs of the USS configured by the system side for the user equipment through a dedicated Radio Resource Control (RRC) message are not received by the user equipment; or the system side uses the PRB pairs of the default USS for transmitting control signaling in a UE backoff mode; or the system side uses the PRB pairs of the default USS for transmitting control signaling after the UE cannot correctly receive, for N times, the RRC message for configuring the USS, wherein a value of N is previously agreed.

The above method may further have the following features: the PRB pairs of the default USS comprise:

the PRB pairs of the default USS are allocated to one or more enhanced Physical Downlink Control Channel (ePDCCH) sets to carry the USS of the ePDCCHs; or the default USS is a USS of one or more ePDCCH sets.

The above method may further have the following features: the system side notifying the user equipment of positions of the PRB pairs of the default USS comprises:

the system side notifying the user equipment of the positions of the PRB pairs of the default USS through a system broadcast message.

The above method may further have the following features: the system side notifying the user equipment of positions of the PRB pairs of the default USS comprises:

the system side indicating the positions of the PRB pairs of the default USS through information in Downlink Control Information (DCI) transmitted in the PRB pairs of an enhanced Common Search Space (eCSS) of the ePDCCHs.

The above method may further have the following features: the system side agreeing with the user equipment on the positions of the PRB pairs of the default USS comprises:

the system side agreeing with the user equipment on using PRB pairs in fixed positions as the PRB pairs of the default USS.

The above method may further have the following features: the system side agreeing with the user equipment on using PRB pairs in fixed positions as the PRB pairs of the default USS comprises:

the system side and the user equipment using one or more PRB pairs from 6 PRB pairs in the middle of a system bandwidth as the PRB pairs of the default USS.

The above method may further have the following features: the system side agreeing with the user equipment on the positions of the PRB pairs of the default USS comprises:

the system side previously agreeing with the user equipment on a correspondence relationship between the PRB pairs of the default USS and one or more determined channels/signals, and uniquely determining the PRB pairs of the default USS according to the channels/signals and the correspondence relationship.

The above method may further have the following features: the determined channels/signals comprise one or a combination of:

a Physical cell ID, a system bandwidth, a frame number, a subframe number, positions of PRB pairs of the eCSS, a Cell Radio Network Temporary Identifier (C-RNTI) of the user equipment, and a temporary C-RNTI of the user equipment.

The above method may further have the following features: the system side agreeing with the user equipment on the PRB pairs of the default USS comprises:

the system side agreeing with the user equipment on:

the positions of the PRB pairs of the default USS being a PRB pair from the 6 PRB pairs in the middle of the system bandwidth with a number equal to a remainder obtained by the Physical cell ID, or the C-RNTI of the user equipment, or the temporary C-RNTI of the user equipment mod 6 or equal to a value of the reminder plus 1; or the positions of the PRB pairs of the default USS being a PRB pair from the PRB pairs in the system bandwidth with a number equal to a remainder obtained by the Physical cell ID, or the C-RNTI of the user equipment, or the temporary C-RNTI of the user equipment mod a maximum number of PRB pairs corresponding to the system bandwidth or equal to a value of the reminder plus 1.

The above method may further have the following features: the system side agreeing with the user equipment on the positions of the PRB pairs of the default USS comprises:

the system side agreeing with the user equipment on determining the PRB pairs of the default USS according to the frame number, wherein, positions of the PRB pairs of the default USS in odd frames are the same, positions of the PRB pairs of the default USS in even frames are the same, and the positions of the PRB pairs of the default USS in odd frames are different from the positions of the PRB pairs of the default USS in even frames.

The above method may further have the following features: the system side agreeing with the user equipment on the positions of the PRB pairs of the default USS comprises:

the system side agreeing with the user equipment on determining the PRB pairs of the default USS according to the subframe number, wherein, positions of the PRB pairs of the default USS in odd subframes are the same, positions of the PRB pairs of the default USS in even subframes are the same, and the positions of the PRB pairs of the default USS in odd subframes are different from the positions of the PRB pairs of the default USS in even subframes.

The above method may further have the following features: the system side agreeing with the user equipment on the positions of the PRB pairs of the default USS comprises:

the system side agreeing with the user equipment on the PRB pairs of the default USS appearing periodically and only appearing in subframes where a position configuration period arrives.

The above method may further have the following features: the position configuration period is fixed, or is notified by the system side to the user equipment through signaling.

The above method may further have the following features: the positions of the PRB pairs of the default USS in the subframes where the position configuration period arrives are fixed and numbers thereof are the same; or the positions of the PRB pairs of the default USS in the subframes where the position configuration period arrives are different and numbers thereof are the same; or initial positions of the PRB pairs of the default USS in the subframes where the position configuration period arrives are the same but numbers thereof are different.

The above method may further have the following features: the positions of the PRB pairs of the default USS satisfy that:

the positions of the PRB pairs of the default USS are orthogonal to the positions of the PRB pairs of the default USS of a neighbor cell, or when the positions of the PRB pairs of the default USS are completely or partly the same as the positions of the PRB pairs of the default USS of the neighbor cell, Control Channel Elements (CCEs) used in the PRB pairs of the default USS are orthogonal to the CCEs used in the PRB pairs of the default USS of the neighbor cell.

The above method may further have the following features: the system side agreeing with the user equipment on the positions of the PRB pairs of the default USS comprises:

the system side agreeing with the user equipment on the positions of the PRB pairs of the default USS being the same as those of the PRB pairs of the eCSS.

The above method may further have the following features: when the system side notifies the user equipment of the positions of the PRB pairs of the default USS in a notification manner, the PRB pairs of the default USS are the same as or are partly the same as the PRB pairs of the eCSS.

The above method may further have the following features: the method further comprises: when the positions of the PRB pairs of the default US S are the same as those of the PRB pairs of the eCSS, the system side agreeing with the user equipment on a range of the CCEs used by the default USS being different from that of the CCEs used by the eCSS, wherein both ranges are fixed respectively.

The above method may further have the following features: the method further comprises: when the positions of the PRB pairs of the default USS are the same as the positions of the PRB pairs of the eCSS, the system side agreeing with the user equipment on the CCEs used by the default USS comprising all CCEs in the PRB pairs of the default USS and the eCSS only using the CCEs agreed for the eCSS in the PRB pairs of the eCSS.

The above method may further have the following features: the system side agreeing with the user equipment on the positions of the PRB pairs of the default USS comprises:

the system side agreeing with the user equipment on the following relationship between the positions of the PRB pairs of the default USS and the positions of the PRB pairs of the eCSS: the PRB pairs of the default USS adjoining backward or forward the PRB pairs of the eCSS in accordance with numbers.

The above method may further have the following features: adjoining backward or forward in accordance with numbers comprises: when adjoining backward or forward in accordance with numbers of the PRB pairs of the eCSS, if corresponding numbers do not exist, determining the positions of the PRB pairs of the default USS by cycling in accordance with a number adjoining principle.

The above method may further have the following features: the method further comprises: the system side transmitting a dedicated RRC message to indicate that a DCI for scheduling Physical Downlink Shared Channel (PDSCH) transmission by the user equipment is transmitted in the PRB pairs of the default USS.

The above method may further have the following features: the method further comprises: the system side transmitting a DCI for scheduling msg4, which is one of random access downlink messages, in the PRB pairs of the default USS.

The above method may further have the following features: the method further comprises: the system side transmitting a DCI of the dedicated RRC message of the user equipment in the PRB pairs of the default USS.

The present document further provides a method for configuring a physical resource block of a user equipment search space, comprising:

a user equipment acquiring positions of Physical Resource Block (PRB) pairs of a default USS according to a notification from a system side, or the user equipment agreeing with the system side on the positions of the PRB pairs of the default User equipment specific Search Space (USS).

The above method may further have the following features: the PRB pairs of the default USS are used as the PRB pairs of the USS of the user equipment when the positions of the PRB pairs of the USS configured by the system side for the user equipment through a dedicated Radio Resource Control (RRC) message are not received by the user equipment; or the system side uses the PRB pairs of the default USS for transmitting control signaling in a UE backoff mode; or the system side uses the PRB pairs of the default USS for transmitting control signaling after the UE cannot correctly receive, for N times, the RRC message for configuring the USS, wherein a value of N is previously agreed.

The above method may further have the following features: the PRB pairs of the default USS comprise:

the PRB pairs of the default USS are allocated to one or more enhanced Physical Downlink Control Channel (ePDCCH) sets to carry the USS of the ePDCCHs; or the default USS is a USS of one or more ePDCCH sets.

The above method may further have the following features: the user equipment acquiring positions of PRB pairs of a default USS according to a notification from a system side comprises:

the user equipment acquiring the positions of the PRB pairs of the default USS through a system broadcast message.

The above method may further have the following features: the user equipment acquiring positions of PRB pairs of a default USS according to a notification from a system side comprises:

the user equipment acquiring the positions of the PRB pairs of the default USS through information in the DCI transmitted in the PRB pairs of the eCSS of the ePDCCH.

The above method may further have the following features: the user equipment agreeing with the system side on the positions of the PRB pairs of the default USS comprises:

the user equipment agreeing with the system side on using PRB pairs in fixed positions as the PRB pairs of the default USS.

The above method may further have the following features: the user equipment agreeing with the system side on using PRB pairs in fixed positions as the PRB pairs of the default USS comprises:

the user equipment agreeing with the system side on using one or more PRB pairs from 6 PRB pairs in the middle of a system bandwidth as the PRB pairs of the default USS.

The above method may further have the following features: the user equipment agreeing with the system side on the positions of the PRB pairs of the default USS comprises:

the user equipment previously agreeing with the system side on a correspondence relationship between the PRB pairs of the default USS and one or more determined channels/signals, and uniquely determining the PRB pairs of the default USS according to the channels/signals and the correspondence relationship.

The above method may further have the following features: the determined channels/signals comprise one or a combination of:

a Physical cell ID, a system bandwidth, a frame number, a subframe number, positions of the PRB pairs of the eCSS, a Cell Radio Network Temporary Identifier (C-RNTI) of the user equipment, and a temporary RNTI of the user equipment.

The above method may further have the following features: the user equipment agreeing with the system side on the PRB pairs of the default USS comprises:

the user equipment agreeing with the system side on the positions of the PRB pairs of the default USS being a PRB pair from the 6 PRB pairs in the middle of the system bandwidth with a number equal to a remainder obtained by the Physical cell ID, or the C-RNTI of the user equipment, or the temporary C-RNTI of the user equipment mod 6 or equal to a value of the reminder plus 1; or the positions of the PRB pairs of the default USS being a PRB pair from the PRB pairs in the system bandwidth with a number equal to a remainder obtained by the Physical cell ID, or the C-RNTI of the user equipment, or the temporary C-RNTI of the user equipment mod a maximum number of PRB pairs corresponding to the system bandwidth or equal to a value of the reminder plus 1.

The above method may further have the following features: the user equipment agreeing with the system side on the positions of the PRB pairs of the default USS comprises:

the user equipment agreeing with the system side on determining the PRB pairs of the default USS according to the frame number, wherein, positions of the PRB pairs of the default USS in odd frames are the same, positions of the PRB pairs of the default USS in even frames are the same, and the positions of the PRB pairs of the default USS in odd frames are different from the positions of the PRB pairs of the default USS in even frames.

The above method may further have the following features: the user equipment agreeing with the system side on the PRB pairs of the default USS comprises:

the user equipment agreeing with the system side on determining the PRB pairs of the default USS according to the subframe number, wherein, positions of the PRB pairs of the default USS in odd subframes are the same, positions of the PRB pairs of the default USS in even subframes are the same, and the positions of the PRB pairs of the default USS in odd subframes are different from the positions of the PRB pairs of the default USS in even subframes.

The above method may further have the following features: the user equipment agreeing with the system side on the positions of the PRB pairs of the default USS comprises:

the user equipment agreeing with the system side on the PRB pairs of the default USS appearing periodically and only appearing in subframes where a position configuration period arrives.

The above method may further have the following features: the position configuration period is fixed, or is acquired by the user equipment according to the signaling transmitted by the system side.

The above method may further have the following features: the positions of the PRB pairs of the default USS in the subframes where the position configuration period arrives are fixed and numbers thereof are the same; or the positions of the PRB pairs of the default USS in the subframes where the position configuration period arrives are different and numbers thereof are the same; or initial positions of the PRB pairs of the default USS in the subframes where the position configuration period arrives are the same but numbers thereof are different.

The above method may further have the following features: the positions of the PRB pairs of the default USS satisfy that:

the positions of the PRB pairs of the default USS are orthogonal to the positions of the PRB pairs of the default USS of a neighbor cell, or when the positions of the PRB pairs of the default USS are completely or partly the same as the positions of the PRB pairs of the default USS of the neighbor cell, Control Channel Elements (CCEs) used in the PRB pairs of the default USS are orthogonal to the CCEs used in the PRB pairs of the default USS of the neighbor cell.

The above method may further have the following features: the user equipment agreeing with the system side on the positions of the PRB pairs of the default USS comprises:

the user equipment agreeing with the system side on the positions of the PRB pairs of the default USS being the same as those of the PRB pairs of the eCSS.

The above method may further have the following features: the positions of the PRB pairs of the default USS acquired by the user equipment according to the notification from the system side are the same as or are partly the same as the positions of the PRB pairs of the eCSS.

The above method may further have the following features: the method further comprises: when the positions of the PRB pairs of the default US S are the same as those of the PRB pairs of the eCSS, the user equipment agreeing with the system side on a range of the CCEs used by the default USS being different from that of the CCEs used by the eCSS, wherein both ranges are fixed respectively.

The above method may further have the following features: the method further comprises: when the positions of the PRB pairs of the default USS are the same as the positions of the PRB pairs of the eCSS, the user equipment agreeing with the system side on the CCEs used by the default USS comprising all CCEs in the PRB pairs of the default USS and the eCSS only using the CCEs agreed for the eCSS in the PRB pairs of the eCSS.

The above method may further have the following features: the user equipment agreeing with the system side on the positions of the PRB pairs of the default USS comprises:

the user equipment agreeing with the system side on the following relationship between the positions of the PRB pairs of the default USS and the positions of the PRB pairs of the eCSS: the PRB pairs of the default USS adjoining backward or forward the PRB pairs of the eCSS in accordance with numbers.

The above method may further have the following features: adjoining backward or forward in accordance with numbers comprises: when adjoining backward or forward in accordance with numbers of the PRB pairs of the eCSS, if corresponding numbers do not exist, determining the positions of the PRB pairs of the default USS by cycling in accordance with a number adjoining principle.

The above method may further have the following features: the method further comprises: the user equipment determining whether a DCI for scheduling Physical Downlink Shared Channel (PDSCH) transmission by the user equipment is transmitted in the PRB pairs of the default USS by receiving a dedicated RRC message.

The above method may further have the following features: the method further comprises: the user equipment receiving a DCI for scheduling msg4, which is one of the random access downlink messages, in the PRB pairs of the default USS.

The above method may further have the following features: the method further comprises: the user equipment receiving a DCI of the dedicated RRC message of the user equipment in the PRB pairs of the default USS.

The above method may further have the following features: the method further comprises:

when the user equipment does not receive the configuration information of the ePDCCH set or the configuration information of the default USS of the ePDCCH, the user equipment using positions of a Physical Uplink Control Channel (1) corresponding to the ePDCCH, or the user equipment using positions of a Physical Uplink Control Channel (PUCCH) received in an enhanced Physical Broadcast Channel (ePBCH) or a System Information Block (SIB).

The present document further provides a system side, comprising:

a configuration unit, configured to configure Physical Resource Block (PRB) pairs of a default User equipment specific Search Space (USS), and notify the user equipment of positions of the PRB pairs of the default USS, or agree with the user equipment on the positions of the PRB pairs of the default USS.

The above system side may further have the following features: the PRB pairs of the default USS are used as PRB pairs of a USS of the user equipment when the positions of the PRB pairs of the USS configured by the system side for the user equipment through a dedicated Radio Resource Control (RRC) message are not received by the user equipment; or the system side uses the PRB pairs of the default USS for transmitting control signaling in a UE backoff mode; or the system side uses the PRB pairs of the default USS for transmitting control signaling after the UE cannot correctly receive, for N times, the RRC message for configuring the USS, wherein a value of N is previously agreed.

The above system side may further have the following features: the PRB pairs of the default USS comprise:

the PRB pairs of the default USS are allocated to one or more enhanced Physical Downlink Control Channel (ePDCCH) sets to carry the USS of the ePDCCHs; or the default USS is a USS of one or more ePDCCH sets.

The above system side may further have the following features: the configuration unit is configured to notify the user equipment of positions of the PRB pairs of the default USS by means of:

the configuration unit notifying the user equipment of the positions of the PRB pairs of the default USS through a system broadcast message.

The above system side may further have the following features: the configuration unit is configured to notify the user equipment of positions of the PRB pairs of the default USS by means of:

the configuration unit indicating the positions of the PRB pairs of the default USS through information in Downlink Control Information (DCI) transmitted in the PRB pairs of an enhanced Common Search Space (eCSS) of the ePDCCHs.

The above system side may further have the following features: the configuration unit is configured to agree with the user equipment on the positions of the PRB pairs of the default USS by means of:

the configuration unit agreeing with the user equipment on using PRB pairs in fixed positions as the PRB pairs of the default USS.

The above system side may further have the following features: the configuration unit is configured to agree with the user equipment on using PRB pairs in fixed positions as the PRB pairs of the default USS by means of:

the configuration unit and the user equipment using one or more PRB pairs from 6 PRB pairs in the middle of a system bandwidth as the PRB pairs of the default USS.

The above system side may further have the following features: the configuration unit is configured to agree with the user equipment on the positions of the PRB pairs of the default USS by means of:

the configuration unit previously agreeing with the user equipment on a correspondence relationship between the PRB pairs of the default USS and one or more determined channels/signals, and uniquely determining the PRB pairs of the default USS according to the channels/signals and the correspondence relationship.

The above system side may further have the following features: the determined channels/signals comprise one or a combination of:

a Physical cell ID, a system bandwidth, a frame number, a subframe number, positions of PRB pairs of the eCSS, a Cell Radio Network Temporary Identifier (C-RNTI) of the user equipment, and a temporary C-RNTI of the user equipment.

The above system side may further have the following features: the configuration unit is configured to agree with the user equipment on the PRB pairs of the default USS by means of:

the configuration unit agreeing with the user equipment on:

the positions of the PRB pairs of the default USS being a PRB pair from the 6 PRB pairs in the middle of the system bandwidth with a number equal to a remainder obtained by the Physical cell ID, or the C-RNTI of the user equipment, or the temporary C-RNTI of the user equipment mod 6 or equal to a value of the reminder plus 1; or the positions of the PRB pairs of the default USS being a PRB pair from the PRB pairs in the system bandwidth with a number equal to a remainder obtained by the Physical cell ID, or the C-RNTI of the user equipment, or the temporary C-RNTI of the user equipment mod a maximum number of PRB pairs corresponding to the system bandwidth or equal to a value of the reminder plus 1.

The above system side may further have the following features: the configuration unit is configured to agree with the user equipment on the positions of the PRB pairs of the default USS by means of:

the configuration unit agreeing with the user equipment on determining the PRB pairs of the default USS according to the frame number, wherein, positions of the PRB pairs of the default USS in odd frames are the same, positions of the PRB pairs of the default USS in even frames are the same, and the positions of the PRB pairs of the default USS in odd frames are different from the positions of the PRB pairs of the default USS in even frames.

The above system side may further have the following features: the configuration unit is configured to agree with the user equipment on the positions of the PRB pairs of the default USS by means of:

the configuration unit agreeing with the user equipment on determining the PRB pairs of the default USS according to the subframe number, wherein, positions of the PRB pairs of the default USS in odd subframes are the same, positions of the PRB pairs of the default USS in even subframes are the same, and the positions of the PRB pairs of the default USS in odd subframes are different from the positions of the PRB pairs of the default USS in even subframes.

The above system side may further have the following features: the configuration unit is configured to agree with the user equipment on the positions of the PRB pairs of the default USS by means of:

the configuration unit agreeing with the user equipment on the PRB pairs of the default USS appearing periodically and only appearing in subframes where a position configuration period arrives.

The above system side may further have the following features: the position configuration period is fixed, or is notified by the system side to the user equipment through signaling.

The above system side may further have the following features: the positions of the PRB pairs of the default USS in the subframes where the position configuration period arrives are fixed and numbers thereof are the same; or the positions of the PRB pairs of the default USS in the subframes where the position configuration period arrives are different and numbers thereof are the same; or initial positions of the PRB pairs of the default USS in the subframes where the position configuration period arrives are the same but numbers thereof are different.

The above system side may further have the following features: the positions of the PRB pairs of the default USS satisfy that:

the positions of the PRB pairs of the default USS are orthogonal to the positions of the PRB pairs of the default USS of a neighbor cell, or when the positions of the PRB pairs of the default USS are completely or partly the same as the positions of the PRB pairs of the default USS of the neighbor cell, Control Channel Elements (CCEs) used in the PRB pairs of the default USS are orthogonal to the CCEs used in the PRB pairs of the default USS of the neighbor cell.

The above system side may further have the following features: the configuration unit is configured to agree with the user equipment on the positions of the PRB pairs of the default USS by means of:

the configuration unit agreeing with the user equipment on the positions of the PRB pairs of the default USS being the same as those of the PRB pairs of the eCSS.

The above system side may further have the following features: when the configuration unit is configured to notify the user equipment of the positions of the PRB pairs of the default USS in a notification manner, the PRB pairs of the default USS are the same as or are partly the same as the PRB pairs of the eCSS.

The above system side may further have the following features: the configuration unit is further configured to: when the positions of the PRB pairs of the default USS are the same as those of the PRB pairs of the eCSS, agree with the user equipment on the range of the CCEs used by the default USS being different from that of the CCEs used by the eCSS, wherein both ranges are fixed respectively.

The above system side may further have the following features: the configuration unit is further configured to: when the positions of the PRB pairs of the default USS are the same as the positions of the PRB pairs of the eCSS, agree with the user equipment on the CCEs used by the default USS comprising all CCEs in the PRB pairs of the default USS and the eCSS only using the CCEs agreed for the eCSS in the PRB pairs of the eCSS.

The above system side may further have the following features: the configuration unit is configured to agree with the user equipment on the positions of the PRB pairs of the default USS by means of:

the configuration unit agreeing with the user equipment on the following relationship between the positions of the PRB pairs of the default USS and the positions of the PRB pairs of the eCSS: the PRB pairs of the default USS adjoining backward or forward the PRB pairs of the eCSS in accordance with numbers.

The above system side may further have the following features: adjoining backward or forward in accordance with numbers comprises: when adjoining backward or forward in accordance with numbers of the PRB pairs of the eCSS, if corresponding numbers do not exist, determining the positions of the PRB pairs of the default USS by cycling in accordance with a number adjoining principle.

The above system side may further have the following features: the system side further comprises: an indication unit, configured to transmit a dedicated RRC message to indicate that a DCI for scheduling Physical Downlink Shared Channel (PDSCH) transmission by the user equipment is transmitted in the PRB pairs of the default USS.

The above system side may further have the following features: the system side further comprises: a control information transmission unit, configured to transmit a DCI for scheduling msg4, which is one of random access downlink messages, in the PRB pairs of the default USS.

The above system side may further have the following features: the system side further comprises: a control information transmission unit, configured to transmit a DCI of the dedicated RRC message of the user equipment in the PRB pairs of the default USS.

The present document further provides a user equipment, comprising:

an information acquisition unit, configured to acquire positions of Physical Resource Block (PRB) pairs of a default USS according to a notification from a system side, or agree with the system side on the positions of the PRB pairs of the default User equipment specific Search Space (USS).

The above user equipment may further have the following features: the PRB pairs of the default USS are used as the PRB pairs of the USS of the user equipment when the positions of the PRB pairs of the USS configured by the system side for the user equipment through a dedicated Radio Resource Control (RRC) message are not received by the user equipment; or the system side uses the PRB pairs of the default USS for transmitting control signaling in a UE backoff mode; or the system side uses the PRB pairs of the default USS for transmitting control signaling after the UE cannot correctly receive, for N times, the RRC message for configuring the USS, wherein a value of N is previously agreed.

The above user equipment may further have the following features: the PRB pairs of the default USS comprise:

the PRB pairs of the default USS are allocated to one or more enhanced Physical Downlink Control Channel (ePDCCH) sets to carry the USS of the ePDCCHs; or the default USS is a USS of one or more ePDCCH sets.

The above user equipment may further have the following features: the information acquisition unit is configured to acquire positions of the PRB pairs of a default USS according to the notification from a system side by means of:

the information acquisition unit acquiring the positions of the PRB pairs of the default USS through a system broadcast message.

The above user equipment may further have the following features: the information acquisition unit is configured to acquire positions of the PRB pairs of a default USS according to the notification from a system side by means of:

the information acquisition unit acquiring the positions of the PRB pairs of the default USS through information in the DCI transmitted in the PRB pairs of the eCSS of the ePDCCH.

The above user equipment may further have the following features: the information acquisition unit is configured to agree with the system side on the positions of the PRB pairs of the default USS by means of:

the information acquisition unit agreeing with the system side on using PRB pairs in fixed positions as the PRB pairs of the default USS.

The above user equipment may further have the following features: the information acquisition unit is configured to agree with the system side on using PRB pairs in fixed positions as the PRB pairs of the default USS by means of:

the information acquisition unit agreeing with the system side on using one or more PRB pairs from 6 PRB pairs in the middle of a system bandwidth as the PRB pairs of the default USS.

The above user equipment may further have the following features: the information acquisition unit is configured to agree with the system side on the positions of the PRB pairs of the default USS by means of:

the information acquisition unit previously agreeing with the system side on a correspondence relationship between the PRB pairs of the default USS and one or more determined channels/signals, and uniquely determining the PRB pairs of the default USS according to the channels/signals and the correspondence relationship.

The above user equipment may further have the following features: the determined channels/signals comprise one or a combination of:

a Physical cell ID, a system bandwidth, a frame number, a subframe number, positions of the PRB pairs of the eCSS, a Cell Radio Network Temporary Identifier (C-RNTI) of the user equipment, and a temporary C-RNTI of the user equipment.

The above user equipment may further have the following features: the information acquisition unit is configured to agree with the system side on the PRB pairs of the default USS by means of:

the information acquisition unit agreeing with the system side on the positions of the PRB pairs of the default USS being a PRB pair from the 6 PRB pairs in the middle of the system bandwidth with a number equal to a remainder obtained by the Physical cell ID, or the C-RNTI of the user equipment, or the temporary C-RNTI of the user equipment mod 6 or equal to a value of the reminder plus 1; or the positions of the PRB pairs of the default USS being a PRB pair from the PRB pairs in the system bandwidth with a number equal to a remainder obtained by the Physical cell ID, or the C-RNTI of the user equipment, or the temporary C-RNTI of the user equipment mod a maximum number of PRB pairs corresponding to the system bandwidth or equal to a value of the reminder plus 1.

The above user equipment may further have the following features: the information acquisition unit is configured to agree with the system side on the positions of the PRB pairs of the default USS by means of:

the information acquisition unit agreeing with the system side on determining the PRB pairs of the default USS according to the frame number, wherein, positions of the PRB pairs of the default USS in odd frames are the same, positions of the PRB pairs of the default USS in even frames are the same, and the positions of the PRB pairs of the default USS in odd frames are different from the positions of the PRB pairs of the default USS in even frames.

The above user equipment may further have the following features: the information acquisition unit is configured to agree with the system side on the PRB pairs of the default USS by means of:

the information acquisition unit agreeing with the system side on determining the PRB pairs of the default USS according to the subframe number, wherein, positions of the PRB pairs of the default USS in odd subframes are the same, positions of the PRB pairs of the default USS in even subframes are the same, and the positions of the PRB pairs of the default USS in odd subframes are different from the positions of the PRB pairs of the default USS in even subframes.

The above user equipment may further have the following features: the information acquisition unit is configured to agree with the system side on the positions of the PRB pairs of the default USS by means of:

the information acquisition unit agreeing with the system side on the PRB pairs of the default USS appearing periodically and only appearing in subframes where a position configuration period arrives.

The above user equipment may further have the following features: the position configuration period is fixed, or is acquired by the user equipment according to the signaling transmitted by the system side.

The above user equipment may further have the following features: the positions of the PRB pairs of the default USS in the subframes where the position configuration period arrives are fixed and numbers thereof are the same; or the positions of the PRB pairs of the default USS in the subframes where the position configuration period arrives are different and numbers thereof are the same; or initial positions of the PRB pairs of the default USS in the subframes where the position configuration period arrives are the same but numbers thereof are different.

The above user equipment may further have the following features: the positions of the PRB pairs of the default USS satisfy that:

the positions of the PRB pairs of the default USS are orthogonal to the positions of the PRB pairs of the default USS of a neighbor cell, or when the positions of the PRB pairs of the default USS are completely or partly the same as the positions of the PRB pairs of the default USS of the neighbor cell, Control Channel Elements (CCEs) used in the PRB pairs of the default USS are orthogonal to the CCEs used in the PRB pairs of the default USS of the neighbor cell.

The above user equipment may further have the following features: the information acquisition unit is configured to agree with the system side on the positions of the PRB pairs of the default USS by means of:

the information acquisition unit agreeing with the system side on the positions of the PRB pairs of the default USS being the same as those of the PRB pairs of the eCSS.

The above user equipment may further have the following features: the positions of the PRB pairs of the default USS acquired by the information acquisition unit according to the notification from the system side are the same as or are partly the same as the positions of the PRB pairs of the eCSS.

The above user equipment may further have the following features: the information acquisition unit is further configured to when the positions of the PRB pairs of the default USS are the same as those of the PRB pairs of the eCSS, agree with the system side on a range of the CCEs used by the default USS being different from that of the CCEs used by the eCSS, wherein both ranges are fixed respectively.

The above user equipment may further have the following features: the information acquisition unit is further configured to: when the positions of the PRB pairs of the default USS are the same as the positions of the PRB pairs of the eCSS, agree with the system side on the CCEs used by the default USS comprising all CCEs in the PRB pairs of the default USS and the eCSS only using the CCEs agreed for the eCSS in the PRB pairs of the eCSS.

The above user equipment may further have the following features: the information acquisition unit is configured to agree with the system side on the positions of the PRB pairs of the default USS by means of:

the information acquisition unit agreeing with the system side on the following relationship between the positions of the PRB pairs of the default USS and the positions of the PRB pairs of the eCSS: the PRB pairs of the default USS adjoining backward or forward the PRB pairs of the eCSS in accordance with numbers.

The above user equipment may further have the following features: adjoining backward or forward in accordance with numbers comprises: when adjoining backward or forward in accordance with numbers of the PRB pairs of the eCSS, if corresponding numbers do not exist, determining the positions of the PRB pairs of the default USS by cycling in accordance with a number adjoining principle.

The above user equipment may further have the following features: the user equipment further comprises: a control information determination unit, configured to determine whether a DCI for scheduling Physical Downlink Shared Channel (PDSCH) transmission by the user equipment is transmitted in the PRB pairs of the default USS by receiving a dedicated RRC message.

The above user equipment may further have the following features: the user equipment further comprises: a control information determination unit, configured to receive a DCI for scheduling msg4, which is one of the random access downlink messages, in the PRB pairs of the default USS.

The above user equipment may further have the following features: the user equipment further comprises: a control information determination unit, configured to receive a DCI of the dedicated RRC message of the user equipment in the PRB pairs of the default USS.

The above user equipment may further have the following features: the information acquisition unit is further configured to:

when the user equipment does not receive the configuration information of the ePDCCH set or the configuration information of the default USS of the ePDCCH, use positions of a Physical Uplink Control Channel (1) corresponding to the ePDCCH, or use positions of a PUCCH received in an enhanced Physical Broadcast Channel (ePBCH) or a System Information Block (SIB).

After the embodiments of the present document are used, the scheme of indicating the positions of the PRB pairs of the USS through the dedicated RRC message is feasible. In addition, the problem of the UE receiving the scheduling information of msg4 in the random access process and the problem of the UE receiving the scheduling information of the first dedicated RRC message can also be solved, and the scheme is simple and will not influence the configuration of the PRB pairs of the USS by the system side through the dedicated RRC message of the UE.

PREFERRED EMBODIMENTS OF THE INVENTION

Figure 1:
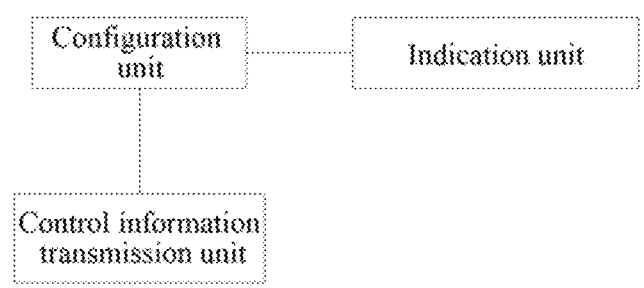
FIG. 1 is a block diagram of a system side according to an embodiment of the present document.

The embodiments of the present document will be described in detail below in conjunction with accompanying drawings. It should be illustrated that without a conflict, the embodiments in the present application and the features in the embodiments can be combined with each other randomly.

The principle idea of the present application is that in consideration that the PDCCH is not used in the NCT, only the ePDCCH is used, and the PRB pairs of the USS of the UE are notified to the UE through a dedicated RRC message, after analysis, the present application proposes that PRB pairs of the default USS are set for the UE (referred to as PRB pairs of the default USS in the present application, which are PRB pairs of the USS of the ePDCCH in practice, are not configured by using a dedicated RRC message, and are PRB pairs of the USS for particular purposes). In addition, as in the LTE, the USS of the ePDCCH is carried based on the PRB pairs at present, they are referred to as the PRB pairs of the default USS in the present application. If the default USS is carried in another manner, for example, in units of OFDM symbols, in units of PRBs, and in units of subcarriers, they are referred to as OFDM symbols of the default USS, PRBs of the default USS, subcarriers of the default USS respectively. The present document will be described by taking the PRB pairs as an example, to solve the problem resulting from the above results (the details can be known from the background of the related art). The PRB pairs of the default USS are used for the UE when the UE does not acquire the information of the PRB pairs of the USS configured by the system side for the UE. That is, when the UE does not acquire the positions of the PRB pairs of the USS configured by the system side for itself through a dedicated RRC message, or the PRB pairs of the USS notified through the dedicated RRC message cannot be used, the network side and the UE use the default USS.

The embodiments of the present document provide a system side setting PRB pairs of the default USS (the function of the default USS is to compensate for the deficiency of the PRB pairs of the existing USS when the existing USS cannot be used), and notifying the positions of the PRB pairs of the default USS to the UE, or the system side previously agreeing with the UE to enable the UE to acquire the positions of the PRB pairs of the default USS set by the system side. Wherein, the PRB pairs of the default USS are PRB pairs of the USS of the UE used when the UE does not receive the positions of the PRB pairs of the USS of the UE configured through the dedicated RRC message. In addition, the PRB pairs of the default USS can also be used after the UE acquires the positions of the PRB pairs of the USS of the UE configured through the dedicated RRC message, but at this time, the usage scenario and the manner need to be previously notified to the UE or need to be previously agreed with the UE, for example, to be used in a UE fallback transmission mode. For example, at this time, control information is transmitted by using PRB pairs of the default USS for scheduling of the UE, and the UE also receives the control information for scheduling by using the PRB pairs of the default USS. As another example, when the UE cannot correctly receive the configuration by the RRC message for the PRB pairs of the USS for N times (a value of N may be previously agreed by the network side and the UE) (the quality of the channel of the UE is relatively poor), this is known by the network side at this time (for example, the network side makes a judgment according to the ACK/NACK fed back by the UE). In this case, the network side and the UE use the PRB pairs of the default USS to transmit the control information.

The PRB pairs of the default USS are allocated to one or more enhanced Physical Downlink Control Channel (ePD- CCH) sets to carry the USS of the ePDCCHs; or the default USS is a USS of one or more ePDCCH sets. The PRB pairs of the default USS may comprise ePDCCHs of one or more UEs.

Figure 3:
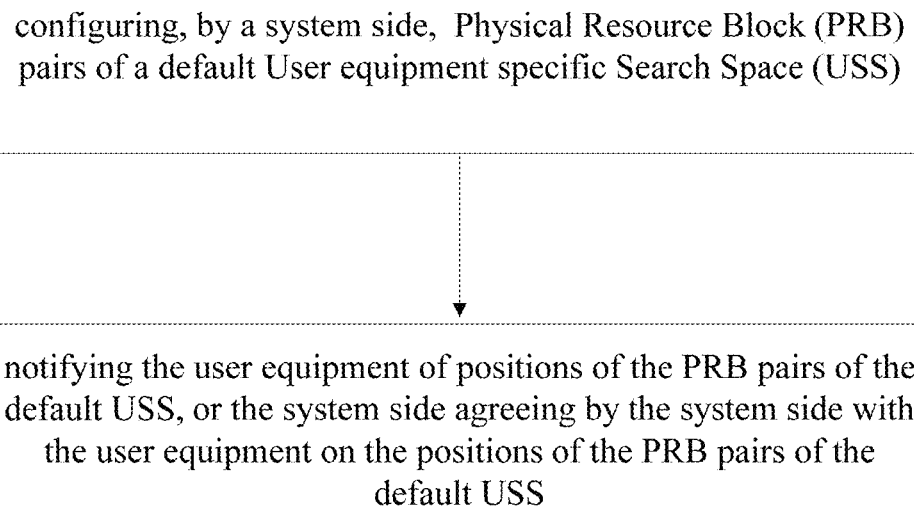
FIG. 3 is a flowchart of a method for configuring a physical resource block of a user equipment search space according to an embodiment of the present document.

FIG. 3 is a flowchart of a method for configuring a physical resource block of a user equipment search space according to an embodiment of the present document.

The embodiments of the present document provide a method for configuring a physical resource block of a user equipment search space, comprising:

notifying, by a system side, the user equipment of positions of the PRB pairs of the default USS, or agreeing by the system side with the user equipment on the positions of the PRB pairs of the default USS. The PRB pairs of the default USS are used as the PRB pairs of the USS of the user equipment when the positions of the PRB pairs of the USS of the user equipment configured by the system side for the user equipment through a dedicated Radio Resource Control (RRC) message are not received by the user equipment.

Wherein, the system side notifies the user equipment of the positions of the PRB pairs of the default USS through the system broadcast notification. A Master Information Block (MIB) or System Information Blocks (SIBs) may be used to carry the notified signaling. With respect to the SIBs, SIB1 and SIB2 are preferable.

Wherein, the system side indicates the positions of the PRB pairs of the default USS through the information in the DCI transmitted in the PRB pairs of the enhanced Common Search Space (eCSS) of the enhanced Physical Downlink Control Channel (ePDCCH).

Wherein, the system side agrees with the user equipment on using PRB pairs in fixed positions as the PRB pairs of the default USS. The system side and the user equipment use one or more PRB pairs from 6 PRB pairs in the middle of the system bandwidth as the PRB pairs of the default USS. Wherein, preferably, the first two PRB pairs with respect to the numbering sequence from 6 PRB pairs in the middle are fixed as the PRB pairs. Wherein, 6 PRB pairs in the middle of the system bandwidth refer to 6 PRB pairs in the center of the system bandwidth. One or more of 6 PRB pairs in the middle of the system bandwidth are used as PRB pairs of the default USS, which is beneficial to only support the use of the present system by a UE with a small bandwidth, for example, a low-cost UE.

Wherein, the system side previously agrees with the user equipment on a correspondence relationship between the PRB pairs of the default USS and one or more determined channels/signals, and uniquely determines the PRB pairs of the default USS according to the channels/signals and the correspondence relationship. For example, there is an agreed position relationship with the Physical Broadcast Channel (PBCH) (or an ePBCH channel).

The determined channels/signals comprise one or a combination of:

a Physical cell ID, a system bandwidth, a frame number, a subframe number, positions of the PRB pairs of the eCSS, a Cell Radio Network Temporary Identifier (C-RNTI) of the UE, and a temporary C-RNTI of the UE.

Wherein, the system side agreeing with the user equipment on the PRB pairs of the default USS comprises:

the system side agreeing with the user equipment on the positions of the PRB pairs of the default USS being:

a position in the 6 PRB pairs in the middle of the system bandwidth corresponding to a remainder obtained by the Physical cell ID, or the C-RNTI of the UE, or the temporary C-RNTI mod 6 or a value of the reminder plus 1. For example, the reminder is in a range of 0-5. When the reminder is i, the PRB pairs of the default USS are a PRB pair from 6 PRB pairs in the middle of the system bandwidth with a number equal to i (numbers of the 6 PRB pairs in the middle of the system bandwidth are 0 to 5 respectively) or i+1 (numbers of the 6 PRB pairs in the middle of the system bandwidth are 1 to 6 respectively). When multiple PRB pairs are needed, the number of the initial PRB pair is determined in the above manner, and the remaining PRB pairs follow the above number of the PRB pair.

Alternatively, a remainder obtained by the Physical cell ID, or the C-RNTI of the UE, or the temporary C-RNTI of the UE mod the maximum number of PRB pairs corresponding to the system bandwidth or a value of the reminder plus 1 corresponds to a position in all PRB pairs in the system bandwidth. For example, the maximum number of PRB pairs corresponding to the system bandwidth is N, and the numbers are 0 to N−1 or 1 to N. Then when the reminder is j, the PRB pair of the default USS is a PRB pair with a number of j or j+1. When multiple PRB pairs are needed, the number of the initial PRB pair is determined in the above manner, and the remaining PRB pairs follow the above number of the PRB pair. Wherein, N may also be a set of PRB pairs configured in the system for the default USS, wherein the default USS can only use part or all of PRB pairs in the set.

Wherein, the system side agrees with the user equipment on determining the PRB pairs of the default USS according to the frame number, wherein, positions of the PRB pairs of the default USS in odd frames are the same, positions of the PRB pairs of the default USS in even frames are the same, and the positions of the PRB pairs of the default USS in odd frames are different from the positions of the PRB pairs of the default USS in even frames.

Wherein, the system side agrees with the user equipment on determining the PRB pairs of the default USS according to the subframe number, wherein, positions of the PRB pairs of the default USS in odd subframes are the same, positions of the PRB pairs of the default USS in even subframes are the same, and the positions of the PRB pairs of the default USS in odd subframes are different from the positions of the PRB pairs of the default USS in even subframes.

Wherein, the system side agrees with the user equipment on the PRB pairs of the default USS appearing periodically and only appearing in subframes where a position configuration period arrives.

Wherein, the position configuration period is fixed, or the system side notifies the user equipment through signaling.

Wherein, the positions of the PRB pairs of the default USS in the subframes where the position configuration period arrives are fixed and numbers thereof are the same; or the positions of the PRB pairs of the default USS in the subframes where the position configuration period arrives are different and numbers thereof are the same; or initial positions of the PRB pairs of the default USS in the subframes where the position configuration period arrives are the same but numbers thereof are different.

Wherein, the positions of the PRB pairs of the default USS satisfy that:

the positions of the PRB pairs of the default USS are orthogonal to the positions of the PRB pairs of the default USS of a neighbor cell, or when the positions of the PRB pairs of the default USS are completely or partly the same as the positions of the PRB pairs of the default USS of the neighbor cell, Control Channel Elements (CCEs) used in the PRB pairs of the default USS are orthogonal to the CCEs used in the PRB pairs of the default USS of the neighbor cell.

Wherein, the system side agreeing with the user equipment on the positions of the PRB pairs of the default USS comprises:

the system side agreeing with the user equipment on the positions of the PRB pairs of the default USS being the same as those of the PRB pairs of the eCSS.

Wherein, when the system side notifies the user equipment of the positions of the PRB pairs of the default USS in a notification manner, the PRB pairs of the default USS are the same as or are partly the same as the PRB pairs of the eCSS.

Wherein, the method further comprises: when the positions of the PRB pairs of the default USS are the same as those of the PRB pairs of the eCSS, the system side agrees with the user equipment on the range of the CCEs used by the default USS being different from that of the CCEs used by the eCSS, wherein both ranges are fixed respectively. For example, when there are 16 CCEs in the PRB pairs of the default USS, it is specified that the USS fixedly uses later 8 CCEs, and the eCSS fixedly uses first 8 CCEs.

Wherein, the method further comprises: when the positions of the PRB pairs of the default USS are the same as the positions of the PRB pairs of the eCSS, the system side agrees with the user equipment on the CCEs used by the default USS comprising all CCEs in the PRB pairs of the default USS and the eCSS only using the CCEs agreed for the eCSS in the PRB pairs of the eCSS.

Wherein, the system side agreeing with the user equipment on the positions of the PRB pairs of the default USS comprises:

the system side agreeing with the user equipment on the following relationship between the positions of the PRB pairs of the default USS and the positions of the PRB pairs of the eCSS: the PRB pairs of the default USS adjoining backward or forward the PRB pairs of the eCSS in accordance with numbers.

Wherein, adjoining backward or forward in accordance with numbers comprises: when adjoining backward or forward in accordance with numbers of the PRB pairs of the eCSS, if the corresponding numbers do not exist, determining the positions of the PRB pairs of the default USS by cycling in accordance with the number adjoining principle.

Wherein, the method further comprises: the base station transmitting a dedicated RRC message to indicate that a DCI for scheduling Physical Downlink Shared Channel (PDSCH) transmission by the UE is transmitted in the PRB pairs of the default USS.

Wherein, the method further comprises: the base station transmitting a DCI for scheduling msg4, which is one of the random access downlink messages, in the PRB pairs of the default USS.

Wherein, the method further comprises: the base station transmitting a DCI of a first dedicated RRC message after the RRC connection of the user equipment is established in the PRB pairs of the default USS.

The mapping principle of the control signaling in the PRB pairs of the default USS can be known with reference to the related art.

The embodiments of the present document further provide a method for configuring a physical resource block of a user equipment search space, comprising:

a user equipment acquiring positions of the PRB pairs of a default USS according to the notification from a system side, or the user equipment agreeing with the system side on the positions of the PRB pairs of the default USS. The PRB pairs of the default USS are used as the PRB pairs of the USS of the user equipment when the positions of the PRB pairs of the USS configured by the system side for the user equipment through a dedicated Radio Resource Control (RRC) message are not received by the user equipment.

The user equipment side corresponds to the system side, and many details described in the method at the system side are also applicable to the user equipment side, and therefore, repeated description of the same or similar parts is omitted.

The system side sets the PRB pairs of the default USS, and notifies the positions of the PRB pairs of the default USS to the UE, or the system side previously agrees with the UE on the acquisition manner or position of the default USS, and the UE determines the PRB pairs of the default USS according to the acquisition manner or the position.

The system side uses the system broadcast message to notify the positions of the PRB pairs of the default USS, wherein, MIB or SIBs in the system broadcast message are preferably used for carrying. With respect to the SIBs, SIB1 and SIB2 are preferable. Other SIBs can also be used; however, preferably, the UE must firstly receive the SIB before random access. After the UE receives the system broadcast message transmitted by the system side which carries the positions of the PRB pairs of the default USS, the UE can acquire the positions of the PRB pairs of the default USS. In this way, when the UE operates subsequently, when the positions of the PRB pairs of the USS transmitted by the system side are not received, the UE can use the PRB pairs of the default USS. This also applies to the system side. When the system side does not transmit the signaling for configuring the positions of the PRB pairs of the USS of the UE to the UE, the system side transmits the scheduling information of the UE through the PRB pairs of the default USS of the UE, wherein the scheduling information comprises DCI information, and an Enhanced Physical hybrid-ARQ indicator channel (ePHICH).

The system side may also transmit the DCI in the PRB pairs of the eCSS of the ePDCCH, and indicate the positions of the PRB pairs of the default USS through the information in the transmitted DCI. After the UE receives the DCI information transmitted in the PRB pairs of the eCSS of the ePDCCH, the UE parses the DCI information, checks whether there are positions of PRB pairs of the default USS in the DCI information, and if so, when the UE has not acquired the PRB pairs of the USS configured by the system side for itself, the UE can use the PRB pairs of the default USS. The DCI is scrambled by using an agreed public Radio Network Temporary Identifier (RNTI).

If the PRB pairs of the default USS and the PRB pairs of the USS exist simultaneously, the system side agrees with the UE side on preferentially using the PRB pairs of the USS. Alternatively, it is agreed on preferentially using the PRB pairs of the default USS. Alternatively, the system side indicates to the UE through signaling that the PRB pairs of the default USS or the PRB pairs of the USS are used. In this way, the UE can only search for a certain PRB pair, and the search range of the UE can be reduced.

The system side and the UE side use a manner of agreeing previously positions and the number of the PRB pairs of the default USS. In this way, a standardized manner is used directly for fixation, which saves the overhead of the signaling. The system side transmits the scheduling information of the UE according to the agreed positions and number of the PRB pairs of the default USS, and the UE side also receives the scheduling information of itself according to the agreed positions of the PRB pairs of the default USS. With respect to determining the positions of the PRB pairs of the default USS according to the previous agreement, preferably, the PRB pairs are located in one or more of 6 PRB pairs in the middle of the system bandwidth, preferably, the first several PRB pairs of the 6 PRB pairs in the middle with respect to the numbering sequence, and the specific number is obtained according to simulation, for example, first 1 or 2 PRB pairs.

The system side may also agree with the UE on a correspondence relationship between the positions of the PRB pairs of the default USS and one or more determined channels/signals, and both the system side and the UE can uniquely determine the positions of the PRB pairs of the default USS according to the correspondence relationship.

The system side agrees with the UE side on using a physical cell ID to calculate and obtain the positions of the PRB pairs of the default USS, for example, calculate a reminder by using the physical cell ID mod 6. The value of the reminder or the value of the reminder plus 1 corresponds to the position of the PRB pair of the default USS in the 6 PRB pairs in the middle of the system bandwidth. The base station side uses the physical cell ID to calculate the positions of the PRB pairs of the default USS in accordance with the above manner, and then information for scheduling the UE such as DCI is transmitted in the PRB pairs. After the UE accesses to the cell, the physical cell ID is obtained, then the positions of the PRB pairs of the default USS are calculated in accordance with the above manner, and then when the PRB pairs of the USS configured by the base station for itself are not obtained, the scheduling information of itself is searched for in the PRB pairs of the default USS.

Certainly, the PRB pairs of the default USS may be placed in any PRB pairs of the system bandwidth, in the above, the PRB pairs are placed in the 6 PRB pairs in the middle, because it is beneficial to support Machine-Type Communication (MTC) UE, for example, a MTC UE which cannot access to a large bandwidth wants to operate in a large-bandwidth system, and at this time, the default USS of the system may be configured in the 6 PRB pairs in the middle. In this way, this kind of UEs may successfully access and operate.

A reminder may be calculated by the physical cell ID mod the maximum number of PRB pairs of the cell, and a value of the reminder or a value of the reminder plus 1 corresponds to a position of the PRB pair of the default USS in the PRB pairs in the system bandwidth. In this way, the default USS may be located in any PRB pair in the whole bandwidth.

The system side can configure the positions of the PRB pairs of the default USS to be different when the frame numbers are odd or even, and the positions of the PRB pairs of the default USS are the same in all odd frames or even frames. The UE determines the positions of the PRB pairs of the default US S in the odd frame or even frames according to the agreed rule. In other words, a period may be configured for the positions of subframes or frames where the PRB pairs of the default USS are located, and the PRB pairs of the default USS are only configured in the subframes or frames determined according to the period. The size of the period is notified to the UE through signaling, and the signaling is carried through MIB or SIBs or the size of the period is fixed; the initial position of the subframe or frame may also be notified through signaling, and the signaling is carried through MIB or SIBs or the initial position is fixed.

The positions of the PRB pairs of the default USS in the subframes where the period arrives are fixed and numbers thereof are the same; or the positions of the PRB pairs of the default USS in the subframes are different but numbers thereof are the same; or initial positions of the PRB pairs of the default USS in the subframes are the same but numbers thereof are different.

When the system side configures the PRB pairs of the default USS, the positions of the PRB pairs of the default USS of neighbor cells are orthogonal with each other, or when the positions of the PRB pairs of the default US S of the neighbor cells are completely or partly the same, the CCEs used in the PRB pairs of the default USS of the neighbor cells are orthogonal with each other.

The system side can transmit a dedicated RRC message to the UE to indicate that the PRB pairs of the default USS are PRB pairs of the USS of the UE, to transmit control information for scheduling data transmission to the UE, for example, DCI for scheduling the PDSCH. When the UE acquires the dedicated RRC message transmitted by the system side which indicates that the PRB pairs of the default USS are PRB pairs of the USS, the UE receives scheduling information in the PRB pairs of the USS.

The system side agrees with the UE on transmitting the DCI for scheduling msg4 in an uplink random access process in the PRB pairs of the default USS. For example, when the base station needs to transmit msg4 to the UE, the base station transmits to the UE scheduling information DCI corresponding to the msg4 in the PRB pairs of the default USS, and when the UE needs to receive the msg4, the UE searches for the scheduling information DCI of msg4 in the PRB pairs of the default USS.

The system side agrees with the UE on the scheduling information DCI of the PRB pairs of the default USS, and the DCI is used to schedule and transmit the first dedicated RRC message of the UE. For example, when it needs to transmit the first dedicated RRC message after the RRC connection is established to the UE, the base station transmits the DCI of the first dedicated RRC message in the PRB pairs of the default USS, and when the UE accepts the first dedicated RRC message after the RRC connection is established, the UE searches for the corresponding DCI in the PRB pairs of the default USS.

The system side may also agrees with the UE on the positions of the PRB pairs of the default USS being the same as positions of the PRB pairs of the eCSS, i.e., both are in the same PRB pairs, and the fixation is standardized.

When the system side indicates the positions of the PRB pairs of the default USS through signaling, the system side may configure the positions of the PRB pairs of the default USS to be the same or partly the same as the PRB pairs of the eCSS through signaling.

When the positions of the PRB pairs of the default USS are the same as those of the PRB pairs of the eCSS, the system side agrees with the UE on the range of the CCEs used by the default USS being different from that of the CCEs used by the eCSS, wherein both ranges are fixed. Alternatively, the system side agrees with the UE side on the CCEs used by the default USS comprising all CCEs in the PRB pairs and the eCSS only using the CCEs agreed for the eCSS.

The system side agrees with the UE side on the following agreed relationship between the positions of the PRB pairs of the default USS and the positions of the PRB pairs of the eCSS: the PRB pairs of the default USS adjoining backward or forward the PRB pairs of the eCSS in accordance with numbers. Specifically, when adjoining backward or forward in accordance with numbers, if the PRB pairs with the corresponding numbers do not exist, the positions of the PRB pairs of the default USS are determined by cycling in accordance with a number adjoining principle.

For example, there are 6 PRB pairs in total in the system bandwidth, and numbers are 0 to 5. If a number of the PRB pair of the eCSS is 4 (assuming the eCSS only uses a PRB pair), according to the number backward adjoining principle, the number of the PRB pair of the default USS is 5 (assuming the default USS uses a PRB pair). As another example, if the number of the PRB pair of the eCSS is 5 (assuming that the eCSS only uses a PRB pair), according to the number backward adjoining principle and the cyclic principle, the number of the PRB pair of the default USS is 0 (assuming that the default USS uses a PRB pair). With respect to the PRB number forward adjoining, it is processed similarly.

After the UE side acquires the set PRB pairs of the default USS, when the UE does not acquire the positions of the PRB pairs of the USS configured for itself, the UE receives the scheduling information of its own in the PRB pairs of the default USS, such as DCI.

The UE can determine the positions of the PRB pairs of he default USS in accordance with the agreed positions of the PRB pairs of the default USS or by receiving the signaling for configuring the positions of the PRB pairs of the default USS which is transmitted by the system side, and receive the DCI of the system side transmitted by the system side therein. Wherein, the PRB pairs of the default USS are used as PRB pairs of a USS of the UE used before the positions of the PRB pairs of the USS configured for the UE through a dedicated RRC message are not received by the UE.

During a specific implementation, when there is a Primary Synchronization Signal/Secondary Synchronization Signal (PSS/SSS), a Physical Broadcast Channel (PBCH), an Enhanced Physical Broadcast Channel (ePBCH), a Demodulation Reference Signal (DMRS), a Channel State Information Reference Signal (CSI-RS) or a CRS in the PRB pairs of the default USS, the resource units occupied by the PSS/SSS, PBCH, ePBCH, DMRS, CSI-RS, or CRS are excluded from the resource units used by the default USS. The UE also does not desire to receive the data of the USS in the resource units occupied by the above PSS/SSS, PBCH, ePBCH, DMRS, CSI-RS or CRS. Alternatively, when the PRB pairs of the default USS comprise the CSI-RS, the CSI-RS is not transmitted in the resource units where the CSI-RS is located, the resource units are used to transmit the default USS, and the UE receives the default USS in the resource units, and does not desire to receive the CSI-RS.

The system side includes a base station, a relay station, a Remote Radio Head (RRH), and a small cell.

All of the above schemes can complete indication of the positions of the PRB pairs of the default USS. If the PRB pairs of the USS of the ePDCCH sets need to be further indicated, the above schemes can also be used, and it needs only to substitute the PRB pairs of the default USS with the PRB pairs of the USS of the ePDCCH sets.

Details of how to use these PRB pairs for the mapping of the ePDCCH (mapping of the USS or eCSS in practice) after the PRB pairs of the default USS of the ePDCCH are obtained will be described below. K is used to represent a total number of sets of PRB pairs of the ePDCCH, or represent a total number of the ePDCCH sets. Several PRB pairs are previously used as a set, and the set is indicated to the UE. The UE searches for the USS or CSS of the ePDCCH in the PRBs included in the set. For example, a set includes 2 or 4 or 8 PRB pairs, and the number of PRB pairs included in the set is represented by N. The PRB pairs in a set may be discrete, or may also be continuous. KL and KD are used to represent the number of sets constituted by discrete PRB pairs and the number of sets constituted by continuous PRB pairs respectively, wherein $K\geq KL+KD$.

For example, it is specified that when K=2, KL and KD may be combined in accordance with the following manner:
{KL=1, KD=0}, {KL=0, KD=1}, {KL=1, KD=1}, {KL=0, KD=2}, {KL=2, KD=0}.

A value of N is {2, 4, 8}.

Further, it is specified that for the USS of the ePDCCH of the NCT in independent operation, in addition to using the above manner, the following manner is further included:

The KL and the KD use the default configuration or the signaling to indicate to the UE. If the default configuration is used, for example, it is specified that the configurations of the KL and KD are merely a combination of the above or one of the following combinations, K=3, and combinations of KL and KD are {KL=0, KD=1}, {KL=1, KD=0}, {KL=0, KD=2}, {KL=2, KD=0}, {KL=1, KD=1}, {KL=0, KD=3}, {KL=1, KD=2}, {KL=2, KD=1}, or {KL=3, KD=0}

If the signaling is used to indicate to the UE, the signaling is transmitted to the UE through broadcast system information or a dedicated RRC message, and the specific sets of K, KL, KD and the value of N may be notified to the UE which needs them through the signaling.

The USS of the ePDCCH of the NCT in independent operation may use 2 or 4 as the value of N, or may define a default value of N according to the system bandwidth. Different system bandwidths correspond to different values of N. For example, the relationship is illustrated in the following table one.

TABLE ONE

| System Bandwidth $N_{RB}^{DL}$ | Set Sizes (N) |
|---|---|
| ≤10 | 2 |
| 11-63 | 4 |
| 64-110 | 8 |

The predefined manner in table two may also be used.

TABLE TWO

| System Bandwidth $N_{RB}^{DL}$ | Set Sizes (N) |
|---|---|
| ≤10 | 2 |
| 11-63 | 2, 4 |
| 64-110 | 4, 8 |

Further, for the NCT in independent operation, after the default PRB pairs of the ePDCCH are indicated, there is a need to indicate at which OFDM symbol in the PRB pairs the mapping of the ePDCCH starts, that is, the initial OFDM symbol. Different default initial positions of the OFDM symbol are defined for different types of subframes, or the third or fourth OFDM is fixed as the initial symbol. Further, the initial OFDM symbol of the PDSCH scheduled by the ePDCCH is the same as the initial OFDM symbol of the ePDCCH. For example, when the PMCH corresponds to the MBSFN subframe, the initial OFDM symbol of the ePDCCH is the third OFDM symbol by default; and the initial OFDM symbol of the ePDCCH corresponding to the regular subframe is the fourth OFDM symbol by default.

Further, for the NCT carrier, the initial parameter X of the DMRS scrambling sequence is the cell ID or the C-RNTI of the UE or the temporary C-RNTI of the UE. The position of the initial eCCE corresponding to the ePDCCH in the PRB set is determined according to the HASH function.

When the downlink scheduling is transmitted in the ePDCCH of the downlink carrier, the initial position of the Physical Uplink Control Channel (PUCCH) in the corresponding uplink carrier thereof is configured in the SIB. Further, before the RRC message configured for the related USS of the related ePDCCH is received, the UE uses the default initial position of the PUCCH, for example, uses the position of the PUCCH (1) corresponding to the ePDCCH, or configures its initial position in the ePBCH or SIB. Specifically, when the UE does not receive the configuration information of the ePDCCH set or the configuration information of the default USS of the ePDCCH, the UE uses the position of the PUCCH (1) corresponding to the ePDCCH, or the UE uses the position of the PUCCH received from the ePBCH or SIB.

The embodiments of the present document further provide a system side, as shown in FIG. 1, comprising:

a configuration unit, configured to configure Physical Resource Block (PRB) pairs of a default User equipment specific Search Space (USS), and notify the user equipment of positions of the PRB pairs of the default USS, or agree with the user equipment on the positions of the PRB pairs of the default USS; wherein, the PRB pairs of the default USS are used as PRB pairs of a USS of the user equipment when the positions of the PRB pairs of the USS configured by the system side for the user equipment through a dedicated Radio Resource Control (RRC) message are not received by the user equipment.

Wherein, the configuration unit is configured to notify the user equipment of positions of the PRB pairs of the default USS by:

the configuration unit notifying the user equipment of the positions of the PRB pairs of the default USS through a system broadcast message.

Alternatively, the configuration unit is configured to indicate the positions of the PRB pairs of the default USS through information in Downlink Control Information (DCI) transmitted in the PRB pairs of an enhanced Common Search Space (eCSS) of the ePDCCHs.

Wherein, the configuration unit is configured to agree with the user equipment on the positions of the PRB pairs of the default USS by:

the configuration unit agreeing with the user equipment on using PRB pairs in fixed positions as the PRB pairs of the default USS. For example, one or more PRB pairs from 6 PRB pairs in the middle of the system bandwidth are used as the PRB pairs of the default USS.

Wherein, the configuration unit is configured to agree with the user equipment on the positions of the PRB pairs of the default USS by:

the configuration unit previously agreeing with the user equipment on a correspondence relationship between the PRB pairs of the default USS and one or more determined channels/signals, and uniquely determining the PRB pairs of the default USS according to the channels/signals and the correspondence relationship.

The configuration unit agrees with the user equipment on:

the positions of the PRB pairs of the default USS being a PRB pair from the 6 PRB pairs in the middle of the system bandwidth with a number equal to a remainder obtained by the Physical cell ID mod 6 or equal to a value of the reminder plus 1; or the positions of the PRB pairs of the default USS being a PRB pair from the PRB pairs in the system bandwidth with a number equal to a remainder obtained by the Physical cell ID mod a maximum number of PRB pairs corresponding to the system bandwidth or equal to a value of the reminder plus 1.

Wherein, the configuration unit is configured to agree with the user equipment on the positions of the PRB pairs of the default USS by:

the configuration unit agreeing with the user equipment on determining the PRB pairs of the default USS according to the frame number, wherein, positions of the PRB pairs of the default USS in odd frames are the same, positions of the PRB pairs of the default USS in even frames are the same, and the positions of the PRB pairs of the default USS in odd frames are different from the positions of the PRB pairs of the default USS in even frames.

Wherein, the configuration unit is configured to agree with the user equipment on the positions of the PRB pairs of the default USS by:

the configuration unit agreeing with the user equipment on determining the PRB pairs of the default USS according to the subframe number, wherein, positions of the PRB pairs of the default USS in odd subframes are the same, positions of the PRB pairs of the default USS in even subframes are the same, and the positions of the PRB pairs of the default USS in odd subframes are different from the positions of the PRB pairs of the default USS in even subframes.

Wherein, the configuration unit is configured to agree with the user equipment on the positions of the PRB pairs of the default USS by:

the configuration unit agreeing with the user equipment on the PRB pairs of the default USS appearing periodically and only appearing in subframes where a position configuration period arrives.

Wherein, the configuration unit is configured to agree with the user equipment on the positions of the PRB pairs of the default USS by:

the configuration unit agreeing with the user equipment on the positions of the PRB pairs of the default USS being the same as those of the PRB pairs of the eCSS.

Wherein, when the configuration unit is configured to notify the user equipment of the positions of the PRB pairs of the default USS in a notification manner, the PRB pairs of the default USS are the same as or are partly the same as the PRB pairs of the eCSS.

Wherein, the configuration unit is further configured to: when the positions of the PRB pairs of the default USS are the same as those of the PRB pairs of the eCSS, agree with the user equipment on the range of the CCEs used by the default USS being different from that of the CCEs used by the eCSS, wherein both ranges are fixed respectively.

Wherein, the configuration unit is further configured to: when the positions of the PRB pairs of the default USS are the same as the positions of the PRB pairs of the eCSS, agree with the user equipment on the CCEs used by the default USS comprising all CCEs in the PRB pairs of the default USS and the eCSS only using the CCEs agreed for the eCSS in the PRB pairs of the eCSS.

Wherein, the configuration unit is configured to agree with the user equipment on the positions of the PRB pairs of the default USS by:

the configuration unit agreeing with the user equipment on the following relationship between the positions of the PRB pairs of the default USS and the positions of the PRB pairs of the eCSS: the PRB pairs of the default USS adjoining backward or forward the PRB pairs of the eCSS in accordance with numbers.

Wherein, the system side further comprises: an indication unit, configured to transmit a dedicated RRC message to indicate that a DCI for scheduling Physical Downlink Shared Channel (PDSCH) transmission by the user equipment is transmitted in the PRB pairs of the default USS.

Wherein, the system side further comprises: a control information transmission unit, configured to transmit a DCI for scheduling msg4, which is one of random access downlink messages, in the PRB pairs of the default USS.

Wherein, the system side further comprises: a control information transmission unit, configured to transmit a DCI of the dedicated RRC message of the user equipment in the PRB pairs of the default USS.

Figure 2:
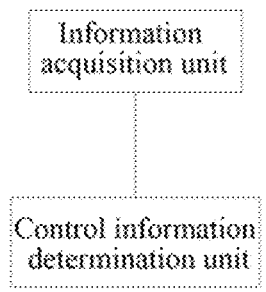
FIG. 2 is a block diagram of a user equipment according to an embodiment of the present document.

The embodiments of the present document further provide a user equipment, as shown in FIG. 2, comprising:

an information acquisition unit, configured to acquire positions of the Physical Resource Block (PRB) pairs of a default USS according to the notification from a system side, or agree with the system side on the positions of the PRB pairs of the default User equipment specific Search Space (USS), wherein the PRB pairs of the default USS are used as the PRB pairs of the USS of the user equipment when the positions of the PRB pairs of the USS configured by the system side for the user equipment through a dedicated Radio Resource Control (RRC) message are not received by the user equipment.

Wherein, the information acquisition unit is configured to acquire positions of the PRB pairs of a default USS according to the notification from a system side by:

the information acquisition unit acquiring the positions of the PRB pairs of the default USS through a system broadcast message.

Wherein, the information acquisition unit is configured to acquire positions of the PRB pairs of a default USS according to the notification from a system side by:

the information acquisition unit acquiring the positions of the PRB pairs of the default USS through information in the DCI transmitted in the PRB pairs of the eCSS of the ePDCCH.

Wherein, the specific method of the information acquisition unit agreeing with the system side on the positions of the PRB pairs of the default USS can be known with reference to the method of the system side agreeing with the user equipment, which will not be described here.

Wherein, the information acquisition unit is further configured to: when the positions of the PRB pairs of the default USS are the same as the positions of the PRB pairs of the eCSS, agree with the system side on the CCEs used by the default USS comprising all CCEs in the PRB pairs of the default USS and the eCSS only using the CCEs agreed for the eCSS in the PRB pairs of the eCSS.

Wherein, the user equipment further comprises: a control information determination unit, configured to determine whether a DCI for scheduling Physical Downlink Shared Channel (PDSCH) transmission by the user equipment is transmitted in the PRB pairs of the default USS by receiving a dedicated RRC message.

Wherein, the user equipment further comprises: a control information determination unit, configured to receive a DCI for scheduling msg4, which is one of the random access downlink messages, in the PRB pairs of the default USS.

Wherein, the user equipment further comprises: a control information determination unit, configured to receive a DCI of the dedicated RRC message of the user equipment in the PRB pairs of the default USS.

It should be illustrated that many details described in the above method embodiments are also applicable to the above system side and the user equipment, and therefore, the repeated description of the same or similar parts is omitted.

A person having ordinary skill in the art should understand that all or part of the steps in the above method can be implemented by programs instructing related hardware, and the programs can be stored in a computer readable storage medium, such as a read-only memory, a disk, or a disc etc. Alternatively, all or part of the steps in the aforementioned embodiments can also be implemented with one or more integrated circuits. Accordingly, various modules/units in the aforementioned embodiments can be implemented in a form of hardware, or can also be implemented in a form of software functional modules. The present document is not limited to any particular form of combination of hardware and software.

The above description is merely preferable embodiments of the present document, instead of limiting the protection scope of the present document. Any amendment, equivalent substitution, improvement etc. made within the spirit and principle of the present document should be covered in the protection scope of the present document.

INDUSTRIAL APPLICABILITY

After the embodiments of the present document are used, the scheme of indicating the positions of the PRB pairs of the USS through the dedicated RRC message is feasible. In addition, the problem of the UE receiving the scheduling information of msg4 in the random access process and the problem of the UE receiving the scheduling information of the first dedicated RRC message can also be solved, and the scheme is simple and will not influence the configuration of the PRB pairs of the USS by the system side through the dedicated RRC message of the UE.

What is claimed is:

1. A method for configuring a physical resource block of a user equipment search space, comprising:
    configuring, by a system side, Physical Resource Block (PRB) pairs of a default User equipment specific Search Space (USS), and
    notifying the user equipment of positions of the PRB pairs of the default USS, or agreeing by the system side with the user equipment on the positions of the PRB pairs of the default USS;
    wherein the positions of the PRB pairs of the default USS satisfy that:
    the positions of the PRB pairs of the default USS are orthogonal to the positions of the PRB pairs of the default US S of a neighbor cell, or when the positions of the PRB pairs of the default USS are completely or partly the same as the positions of the PRB pairs of the default USS of the neighbor cell, Control Channel Elements (CCEs) used in the PRB pairs of the default USS are orthogonal to the CCEs used in the PRB pairs of the default USS of the neighbor cell.

2. The method according to claim 1, wherein, the PRB pairs of the default USS are used as PRB pairs of a USS of the user equipment when the positions of the PRB pairs of the USS configured by the system side for the user equipment through a dedicated Radio Resource Control (RRC) message are not received by the user equipment; or the system side uses the PRB pairs of the default USS for transmitting control signaling in a UE backoff mode; or the system side uses the PRB pairs of the default USS for transmitting control signaling after the UE cannot correctly receive, for N times, the RRC message for configuring the USS, wherein a value of N is previously agreed.

3. The method according to claim 1, wherein, the PRB pairs of the default USS comprise:
    the PRB pairs of the default USS are allocated to one or more enhanced Physical Downlink Control Channel (ePDCCH) sets to carry the USS of the ePDCCHs; or
the default USS is a USS of one or more ePDCCH sets.

4. The method according to claim 1, wherein, the system side agreeing with the user equipment on the positions of the PRB pairs of the default USS comprises:
the system side agreeing with the user equipment on using PRB pairs in fixed positions as the PRB pairs of the default USS.

5. The method according to claim 1, wherein, the system side agreeing with the user equipment on the positions of the PRB pairs of the default USS comprises:
the system side previously agreeing with the user equipment on a correspondence relationship between the PRB pairs of the default USS and one or more determined channels/signals, and uniquely determining the PRB pairs of the default USS according to the channels/signals and the correspondence relationship.

6. The method according to claim 1, wherein, the system side agreeing with the user equipment on the positions of the PRB pairs of the default USS comprises:
the system side agreeing with the user equipment on the PRB pairs of the default USS appearing periodically and only appearing in subframes where a position configuration period arrives.

7. The method according to claim 1, wherein, when the system side notifies the user equipment of the positions of the PRB pairs of the default USS in a notification manner, the PRB pairs of the default USS are the same as or are partly the same as the PRB pairs of the eCSS.

8. The method according to claim 1, further comprising:
the system side transmitting a DCI for scheduling msg4, which is one of random access downlink messages, in the PRB pairs of the default USS.

9. A method for configuring a physical resource block of a user equipment search space, comprising:
acquiring, by a user equipment, positions of Physical Resource Block (PRB) pairs of a default USS according to a notification from a system side, or agreeing by the user equipment with the system side on the positions of the PRB pairs of the default User equipment specific Search Space (USS);
wherein the positions of the PRB pairs of the default USS satisfy that:
the positions of the PRB pairs of the default USS are orthogonal to the positions of the PRB pairs of the default US S of a neighbor cell, or when the positions of the PRB pairs of the default USS are completely or partly the same as the positions of the PRB pairs of the default USS of the neighbor cell, Control Channel Elements (CCEs) used in the PRB pairs of the default USS are orthogonal to the CCEs used in the PRB pairs of the default USS of the neighbor cell.

10. The method according to claim 9, wherein, the PRB pairs of the default USS are used as the PRB pairs of the USS of the user equipment when the positions of the PRB pairs of the USS configured by the system side for the user equipment through a dedicated Radio Resource Control (RRC) message are not received by the user equipment; or the system side uses the PRB pairs of the default USS for transmitting control signaling in a UE backoff mode; or the system side uses the PRB pairs of the default USS for transmitting control signaling after the UE cannot correctly receive, for N times, the RRC message for configuring the USS, wherein a value of N is previously agreed.

11. The method according to claim 9, wherein, the PRB pairs of the default USS comprise:
the PRB pairs of the default USS are allocated to one or more enhanced Physical Downlink Control Channel (ePDCCH) sets to carry the USS of the ePDCCHs; or
the default USS is a USS of one or more ePDCCH sets.

12. The method according to claim 9, wherein, the user equipment agreeing with the system side on the positions of the PRB pairs of the default USS comprises:
the user equipment agreeing with the system side on using PRB pairs in fixed positions as the PRB pairs of the default USS.

13. The method according to claim 9, wherein, the user equipment agreeing with the system side on the positions of the PRB pairs of the default USS comprises:
the user equipment previously agreeing with the system side on a correspondence relationship between the PRB pairs of the default USS and one or more determined channels/signals, and uniquely determining the PRB pairs of the default USS according to the channels/signals and the correspondence relationship.

14. The method according to claim 9, further comprising:
the user equipment receiving a DCI for scheduling msg4, which is one of the random access downlink messages in the PRB pairs of the default USS.

15. A user equipment, comprising hardware performing instructions stored in a non-transitory computer readable medium which executes steps in following unit:
an information acquisition unit, configured to acquire positions of Physical Resource Block (PRB) pairs of a default USS according to a notification from a system side, or agree with the system side on the positions of the PRB pairs of the default User equipment specific Search Space (USS);
wherein the positions of the PRB pairs of the default USS satisfy that:
the positions of the PRB pairs of the default USS are orthogonal to the positions of the PRB pairs of the default US S of a neighbor cell, or when the positions of the PRB pairs of the default USS are completely or partly the same as the positions of the PRB pairs of the default USS of the neighbor cell, Control Channel Elements (CCEs) used in the PRB pairs of the default USS are orthogonal to the CCEs used in the PRB pairs of the default USS of the neighbor cell.

16. The user equipment according to claim 15, wherein, the PRB pairs of the default USS are used as the PRB pairs of the USS of the user equipment when the positions of the PRB pairs of the USS configured by the system side for the user equipment through a dedicated Radio Resource Control (RRC) message are not received by the user equipment; or the system side uses the PRB pairs of the default USS for transmitting control signaling in a UE backoff mode; or the system side uses the PRB pairs of the default USS for transmitting control signaling after the UE cannot correctly receive, for N times, the RRC message for configuring the USS, wherein a value of N is previously agreed.

17. The user equipment according to claim 15, wherein, the PRB pairs of the default USS comprise:
the PRB pairs of the default USS are allocated to one or more enhanced Physical Downlink Control Channel (ePDCCH) sets to carry the USS of the ePDCCHs; or
the default USS is a USS of one or more ePDCCH sets.

18. The user equipment according to claim 15, wherein, the information acquisition unit is configured to agree with the system side on the positions of the PRB pairs of the default USS by means of:

the information acquisition unit agreeing with the system side on using PRB pairs in fixed positions as the PRB pairs of the default USS.

19. The user equipment according to claim 15, wherein, the information acquisition unit is configured to agree with the system side on the positions of the PRB pairs of the default USS by means of:

the information acquisition unit previously agreeing with the system side on a correspondence relationship between the PRB pairs of the default USS and one or more determined channels/signals, and uniquely determining the PRB pairs of the default USS according to the channels/signals and the correspondence relationship.

* * * * *